(12) United States Patent
Muir et al.

(10) Patent No.: US 7,014,755 B2
(45) Date of Patent: Mar. 21, 2006

(54) FILTRATION AND PLUG DRAIN DEVICE FOR CONTAINING OIL AND CHEMICAL SPILLS

(76) Inventors: Iain Muir, 104-2707 Estevan Avenue, Victoria (CA) V8R 2T5; Fiona Elizabeth Barrett, 4-550 Quadra Street, Victoria (CA) V8V 3S3

( * ) Notice: Subject to any disclaimer, the term of this patent is extended or adjusted under 35 U.S.C. 154(b) by 0 days.

(21) Appl. No.: 11/069,968

(22) Filed: Mar. 3, 2005

(65) Prior Publication Data

US 2005/0230302 A1    Oct. 20, 2005

Related U.S. Application Data

(60) Provisional application No. 60/562,242, filed on Apr. 15, 2004.

(51) Int. Cl.
   C02F 1/28    (2006.01)
   E03F 5/16    (2006.01)

(52) U.S. Cl. ............... 210/164; 210/266; 210/282; 210/283; 210/284

(58) Field of Classification Search ............ 210/163, 210/164, 165, 166, 170, 266, 282, 283, 284, 210/287, 290
See application file for complete search history.

(56) References Cited

U.S. PATENT DOCUMENTS

| | | | |
|---|---|---|---|
| 4,302,337 A | 11/1981 | Larson et al. | |
| 4,534,865 A * | 8/1985 | Sundberg et al. | 210/692 |
| 4,915,823 A | 4/1990 | Hall | |
| 5,391,295 A | 2/1995 | Wilcox et al. | |
| 5,403,491 A | 4/1995 | Holland | |
| 5,511,904 A | 4/1996 | Van Egmond | |
| 5,520,823 A | 5/1996 | Jones et al. | |
| 5,662,801 A | 9/1997 | Holland | |
| 5,679,246 A | 10/1997 | Wilcox et al. | |
| 5,720,574 A | 2/1998 | Barella | |
| 5,788,849 A | 8/1998 | Hutter, Jr. et al. | |
| 5,820,762 A | 10/1998 | Bamer et al. | |
| 5,833,862 A | 11/1998 | Holland | |
| 5,849,198 A | 12/1998 | Sharpless | |
| 5,855,774 A | 1/1999 | Boelter | |
| 5,863,440 A | 1/1999 | Rink et al. | |
| 5,908,558 A * | 6/1999 | Holland | 210/692 |
| 6,048,461 A | 4/2000 | Sogell | |
| 6,056,881 A | 5/2000 | Miller et al. | |
| 6,066,264 A | 5/2000 | Ronan et al. | |
| 6,080,307 A | 6/2000 | Morris et al. | |
| 6,083,402 A | 7/2000 | Butler | |
| 6,143,172 A | 11/2000 | Rink et al. | |
| 6,221,243 B1 | 4/2001 | Flanagan | |
| 6,231,758 B1 | 5/2001 | Morris et al. | |
| 6,270,662 B1 | 8/2001 | Gibson et al. | |
| 6,270,663 B1 | 8/2001 | Happel | |

(Continued)

OTHER PUBLICATIONS

CI Agent, website excerpt (3 pagesImmediate Reponse Spill Technologies, LLC [retrieved on Jul. 29, 2003]. Retrieved from the Internet:< URL: http://www.ciagent.com/index.html>.

(Continued)

*Primary Examiner*—Ivars C. Cintins
(74) *Attorney, Agent, or Firm*—Robert H. Barrigar

(57) ABSTRACT

A filter/plug drain assembly for insertion into a drain so as to prevent the passage of selected contaminants through the drain is disclosed. The filter/plug assembly includes stacked layers of filter, filtering/plugging and plugging material. The filter/plug assembly has alternative internal flowpaths configured to provide different plugging speeds when exposed to ongoing low levels of selected contaminants.

18 Claims, 9 Drawing Sheets

U.S. PATENT DOCUMENTS

| | | |
|---|---|---|
| 6,287,459 B1 | 9/2001 | Williamson |
| 6,337,025 B1 | 1/2002 | Clemenson |
| 6,358,422 B1 | 3/2002 | Smith et al. |
| 6,485,639 B1 | 11/2002 | Gannon et al. |
| 6,503,390 B1 | 1/2003 | Gannon |
| 6,521,122 B1 | 2/2003 | Elliot et al. |
| 6,521,125 B1 | 2/2003 | Schillereff |
| 6,531,059 B1 | 3/2003 | Morris et al. |
| 6,533,941 B1 | 3/2003 | Butler |
| 6,537,446 B1 | 3/2003 | Sanguinetti |
| 6,547,962 B1 | 4/2003 | Kistner et al. |
| 6,569,321 B1 | 5/2003 | Coffman |
| 6,632,766 B1 | 10/2003 | Kanazirev |
| 6,638,424 B1 | 10/2003 | Stever et al. |
| 6,641,738 B1 | 11/2003 | Hard |
| 2002/0071722 A1 | 6/2002 | Allard |
| 2002/0113025 A1 | 8/2002 | Gauldin et al. |
| 2003/0029802 A1 | 2/2003 | Ruiz |
| 2003/0047497 A1 | 3/2003 | Harris et al. |
| 2003/0098267 A1 | 5/2003 | Page |
| 2003/0132150 A1 | 7/2003 | Happel |
| 2003/0173277 A1 | 9/2003 | Shaw et al. |

OTHER PUBLICATIONS

Bittenbender, "He liked it so much . . . ," website excerpt (3 pages), Jan. 15, 2001, Business First of Louisville, KY, Jan. 15, 2001 [retrieved Nov. 28, 2003]. Retrieved from the Internet: < URL: http//www.bizjournals.com/louisville/stories/2001/01/15/smallb1.html?t=printable>.

"X-TEX Environmental Filtration Sorbent/Geo-Textile Designed for Removing Oils from Water", product information sheets (2 pages) Mar. 1, 2003, Xextex Corporation.

"Adsorption Capacity of X-TEX Filter Media Compared to Other Oil Sorbent Media", product information sheets (2 pages), Mar. 1, 2003, Xextex Corporation.

\* cited by examiner

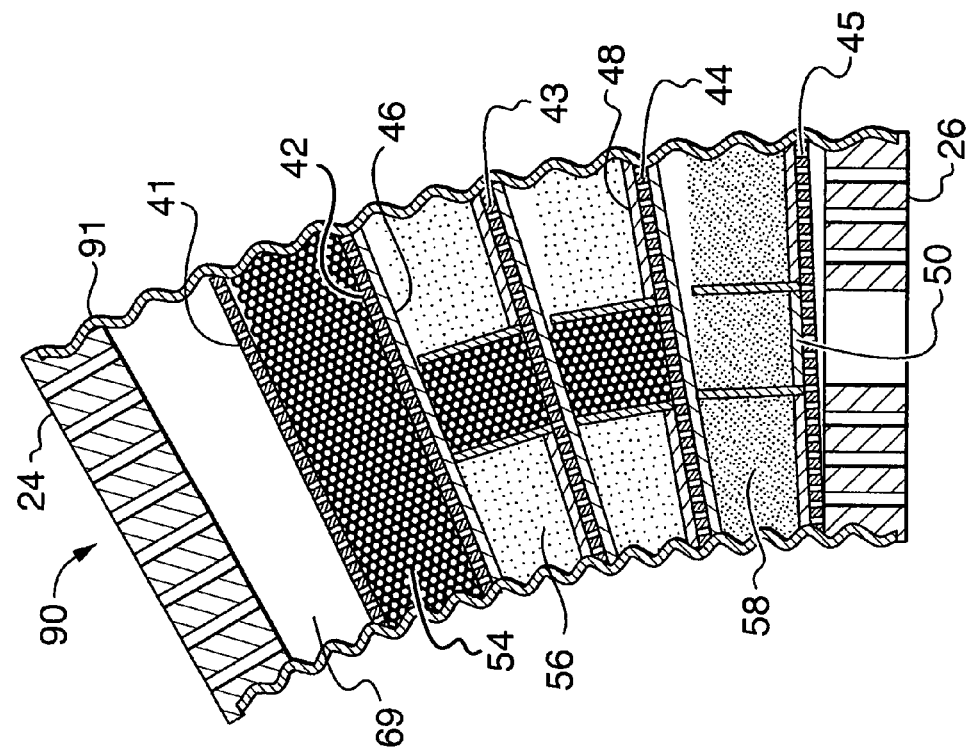
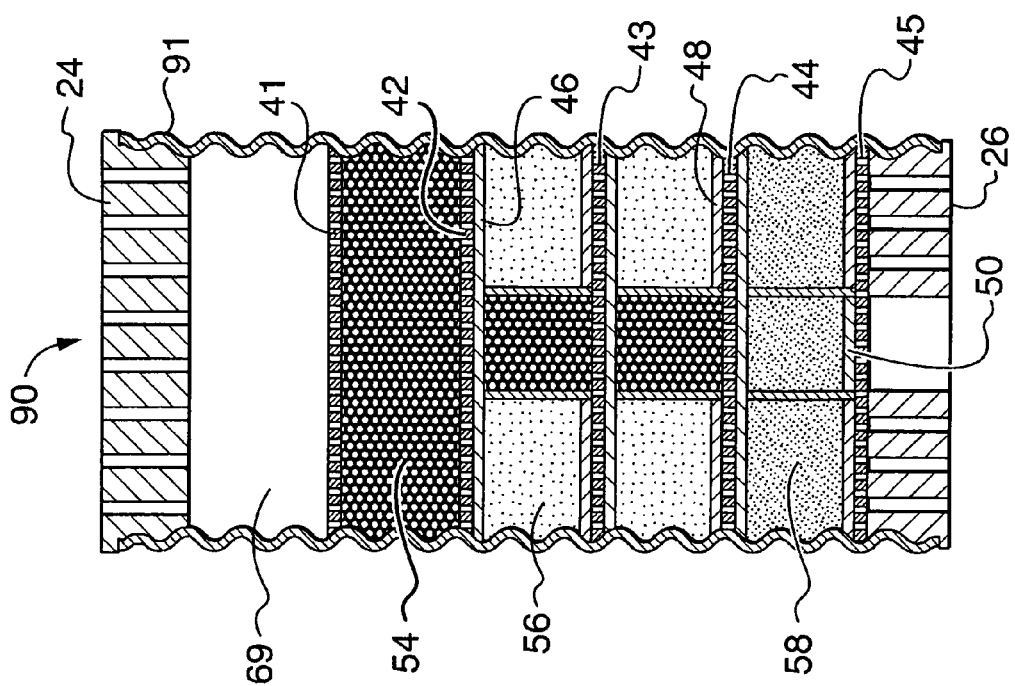

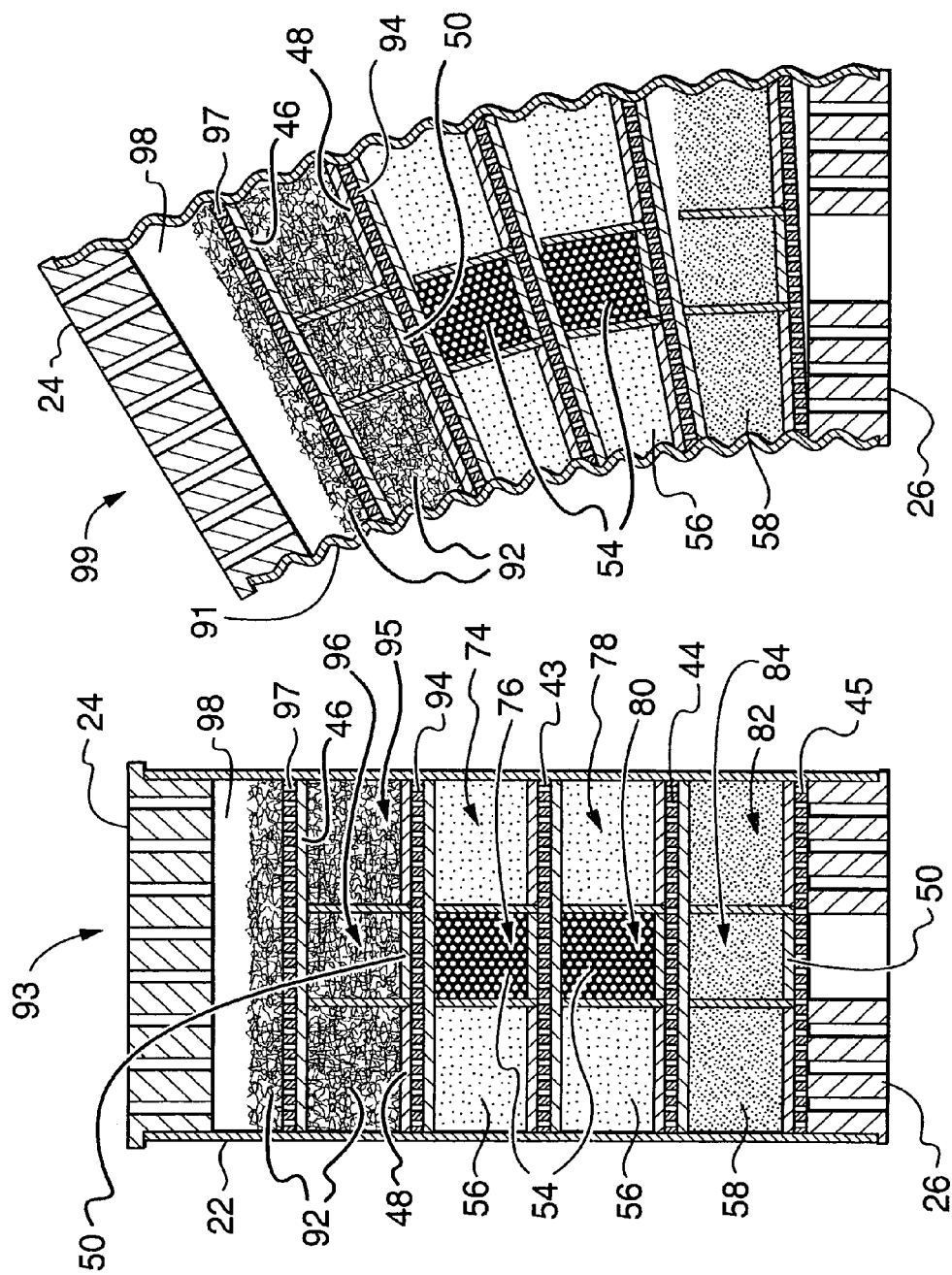

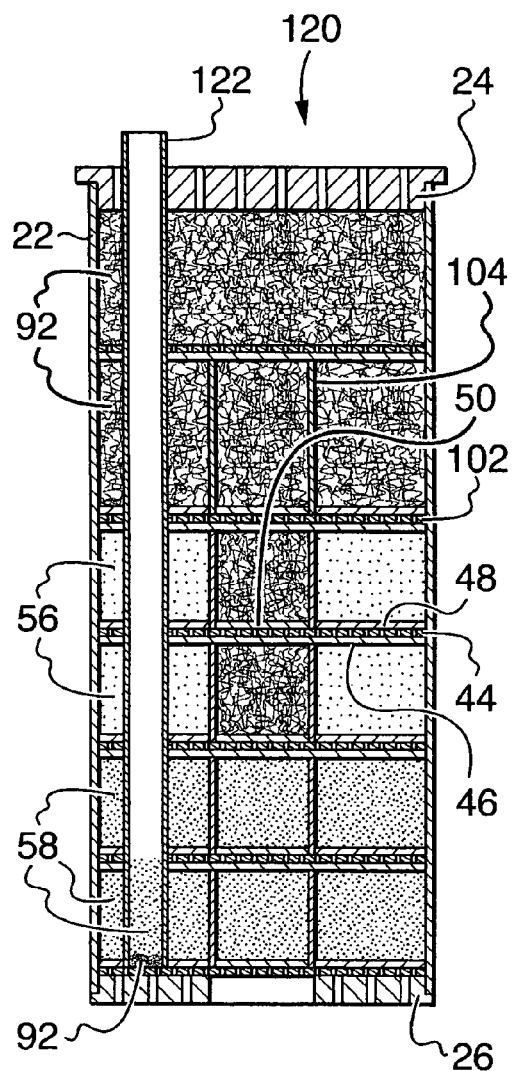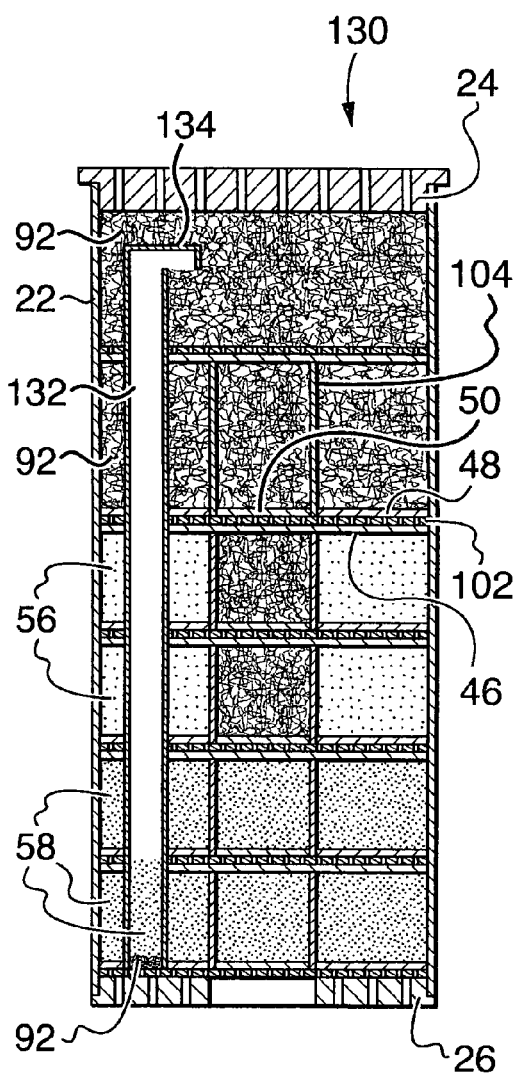

FILTRATION AND PLUG DRAIN DEVICE FOR CONTAINING OIL AND CHEMICAL SPILLS

CROSS-REFERENCE TO RELATED APPLICATION

This application claims the benefit of U.S. Provisional Patent Application No. 60/562,242, filed 15 Apr. 2004.

FIELD OF THE INVENTION

This invention relates to a filtration and plug drain device for containing spills of hydrocarbons and other chemicals. More specifically, this invention relates to a device for use in a water drain for separating hydrocarbons from the drain water and for plugging the drain when the quantity of hydrocarbons exceeds the hydrocarbon removal capacity of the device, as with a hydrocarbon spill or leak.

BACKGROUND OF THE INVENTION

There is growing concern about the inadvertent introduction of hydrocarbons and other chemicals into the environment, and the contamination of surface water with hydrocarbons.

Hydrocarbon contamination of rain and meltwater runoff is a problem in a variety of situations, including: in parking lots and on roadways due to leaks of oil and fuel from vehicles; on rooftops having coatings that release hydrocarbons in warm weather; and in containment areas for electrical transformers, oil tanks and other facilities where large quantities of hydrocarbons are stored or used. Such containment areas typically have a perimeter dyke, such as a soil berm or concrete wall, to prevent the escape of spilled hydrocarbons from the containment area. Containment areas often also have drain systems for rain or meltwater. It is not uncommon for such containment areas to be subject to minor ongoing spills of oil and other hydrocarbons due to minor leaks, servicing of equipment etc. Such containment areas may also be subject to large spills of several thousand gallons of oil or other hydrocarbons.

Methods and apparatus for installation in drains (e.g. storm drains) for preventing hydrocarbons from entering a drainage system (and ultimately rivers and streams) are known.

Larson et al. (U.S. Pat. No. 4,302,337, issued 24 Nov. 1981) discloses an inline device for removing oil from an aqueous stream, comprising a generally coherent mass of oil-imbibing latex particles that swell as they absorb oil such that once exposed to sufficient oil, they swell to an extent that the interstitial spaces between the particles are closed and further flow of water is prevented.

The Wilcox et al patents (U.S. Pat. No. 5,391,295, issued 21 Feb. 1995; and U.S. Pat. No. 5,679,246, issued 21 Oct. 1997) disclose a hydrocarbon spill containment system comprising a housing for insertion in a drain and containing the following layers in the fluid path (going from upstream to downstream and, in the intended installation position, from top to bottom) a filter material (such as sand) in a separate permeable basket; a first geotextile layer; hydrophobic swellable polymer particles; and a second geotextile layer. The polymer particles are granular and the geotextile layers help to contain the particles. As set out in lines 21 to 24 of column 3 of the U.S. Pat. No. 5,679,246 patent, the basket and filter material provide weight on top of the polymer to force it to swell outwards (so as to seal the flow path in the presence of oil) rather than upward. The filter material also traps dirt and other small particles that would clog the polymer material.

The Gannon patents (U.S. Pat. No. 6,485,639, issued 26 Nov. 2002; and U.S. Pat. No. 6,503,390, issued 7 Jan. 2003) disclose a particular oil-targeted filtration/plugging medium (an absorbent comprising alternating units of at least two polymers selected from the group consisting of styrene, pentadiene, cyclopentadiene, butylene, ethylene, isoprene, butadiene and propylene; mixed with non-absorbent particles to provide flow channels through the absorbent); and devices for installation in a drain utilizing the disclosed or other similar filtration/plugging medium. Each of the disclosed devices includes some type of sediment/debris filter upstream of the filtration/plugging medium and porous layers to contain the filtration/plugging medium.

All of the known apparatus and methods for preventing hydrocarbon-contaminated water from entering a drainage system tend to plug the drain in which they are installed, sooner than desired, in that they plug the drains when exposed to the normal low level of oil or other hydrocarbons present in rain and meltwater runoff in containment areas etc. What is needed is an apparatus and method for preventing hydrocarbon-contaminated water from entering a drainage system that when exposed to low levels of contaminants removes the contaminants without plugging, but does plug when exposed to abnormally high levels of contaminants, such as during a major spill.

SUMMARY OF THE INVENTION

It is an object of the present invention to provide an apparatus and method for preventing discharge of hydrocarbons and/or other contaminants into the environment, by removing the hydrocarbons and/or other contaminants from a water stream when the hydrocarbons and/or other contaminants are present in normal unavoidable low levels; and plugging the flow stream when the hydrocarbons and/or other contaminants are present in abnormal high levels.

In this specification and in the claims: "liquid" includes liquids carrying fine particulate matter as well as liquids in the ordinary sense; "stack" does not necessarily imply a vertical orientation of the stacked articles; "contaminant" means any liquid for which passage into a drain is desired to be prevented or severely impeded; "upstream" and "downstream" are with respect to the normal flow of liquid in a drain and within a filter/plug drain assembly installed in a drain; "lateral" and "laterally" mean perpendicular to the general direction of flow of liquid through the drain assembly; and "longitudinal" and "longitudinally" mean parallel to the general direction of flow of liquid through the drain assembly.

In one aspect, the present invention is a filter/plug drain assembly for use in preventing the passage of one or more selected liquid contaminants, comprising filtering/plugging material, for filtering the contaminants from the drain water when the contaminants are below a threshold level and for forming a plug to impede passage of the drain water when the contaminants are above a threshold level; and plugging material downstream from the filtering/plugging material, for receiving drain water from the filter/plugging material and for forming a liquid-blocking plug when coming into contact with any of the contaminants.

In another aspect, the present invention is a filter/plug drain assembly for use in containing spills of one or more selected liquid contaminants; comprising a stack of impeding layers of filtering, filtering/plugging and plugging material, the layer or layers of filtering material being located primarily at the upstream end of the stack; the layer or layers of plugging material being located primarily at the downstream end of the stack; and the layer or layers of filtering/plugging material being located primarily intermediate the filtering and plugging material, the filtering material passing water but impeding the passage of the selected contaminants; the filtering/plugging material passing water but impeding the passage of selected contaminants when low levels of contaminants are present in the water, and forming a liquid blocking plug when exposed to sufficient amounts of contaminants; and the plugging material forming a liquid-blocking plug when coming into contact with a relatively small amount of the selected contaminants.

In another aspect, the present invention is a filter/plug drain assembly having at least two essentially distinct internal flowpaths, with each of the flowpaths configured to provide a different plugging speed, as between each of the flowpaths, when exposed to ongoing low levels of a selected contaminant or contaminants, and to provide essentially immediate blocking when exposed to a high level of the selected contaminant or contaminants.

In another aspect, the present invention is a filter/plug drain assembly for use in containing spills of one or more selected liquid contaminants, comprising a drain body having an inner bore; and a plurality of spacer elements stacked within the inner bore, each spacer element having a perforated laterally-extending planar divider member spanning the inner bore and a tube projecting substantially perpendicularly from the divider member, such that the longitudinal axes of the tubes are generally parallel to the direction of flow within the inner bore. The spacers are configured such that the tubes may be aligned when stacked within the assembly, thus forming two distinct flowpaths, an annular flowpath outside of the tubes and a central flow path within the tubes. Preferably, the inner bore is circular; the divider members are circular; and each tube is concentric with the associated divider member, such that the tubes of the stacked spacers are roughly centered within the inner bore and thus the tubes align automatically as their alignment is unaffected by rotation of the spacers about the longitudinal axes of the tubes. The spaces between the divider members, and within and outside the tubes, may each contain a different filtering, filtering/plugging or plugging material, permitting the user to stratify the filtering, filtering/plugging or plugging material as desired and to provide alternative/complementary flow paths to optimize the response of the filter/plug drain assembly to different contaminants, and extremes of low or high levels of contaminants.

BRIEF DESCRIPTION OF THE DRAWINGS

FIG. 10 is a schematic sectional elevation view of a bendable filter/plug drain insert embodiment of the present invention.

FIG. 11 is a schematic sectional elevation view of the bendable filter/plug drain insert embodiment of FIG. 10, shown bent.

FIG. 12 is a schematic sectional elevation view of a double-filtering-strata filter/plug drain insert embodiment of the present invention FIG. 13 is a schematic sectional elevation view of a bendable variation of the double-filtering-strata filter/plug drain insert embodiment of FIG. 12, shown bent.

FIG. 16 is a schematic sectional elevation view of a bypass drain insert embodiment of the present invention having a projecting bypass pipe.

FIG. 17 is a schematic sectional elevation view of an embodiment of the present invention having an internal capped bypass pipe.

DETAILED DESCRIPTION WITH REFERENCE TO THE DRAWINGS

Figure 1:
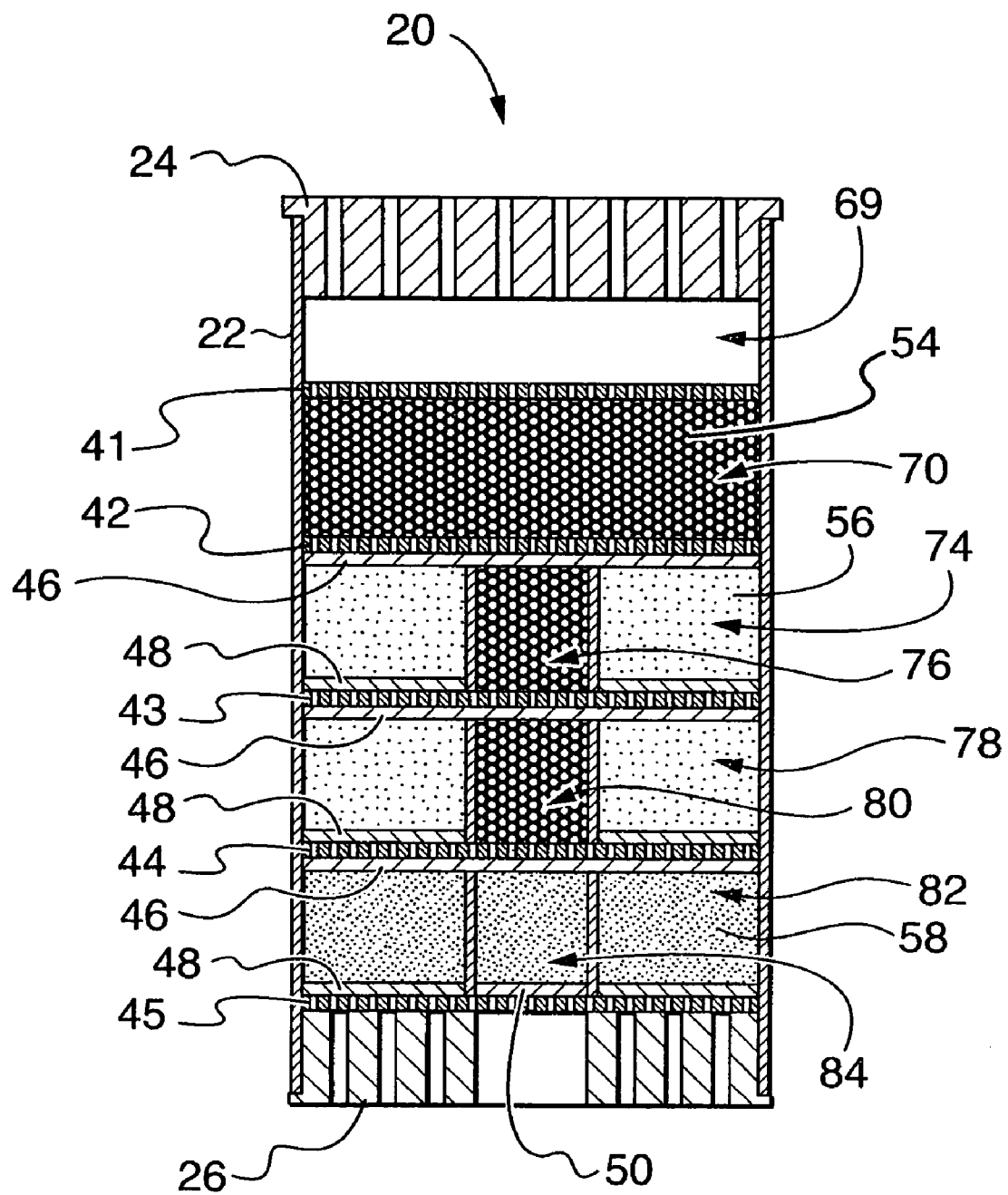
FIG. 1 is a schematic sectional elevation view of a filter/plug drain insert embodiment of the present invention.

FIG. 1 shows a schematic sectional view of a filter/plug drain insert 20 suitable for insertion into a floor drain (not shown) for removing small amounts of a target contaminant from the drain water and plugging the drain when the drain water contains an amount of the target contaminant in excess of the contaminant removal capacity of the filter/plug drain insert 20.

Figure 2:
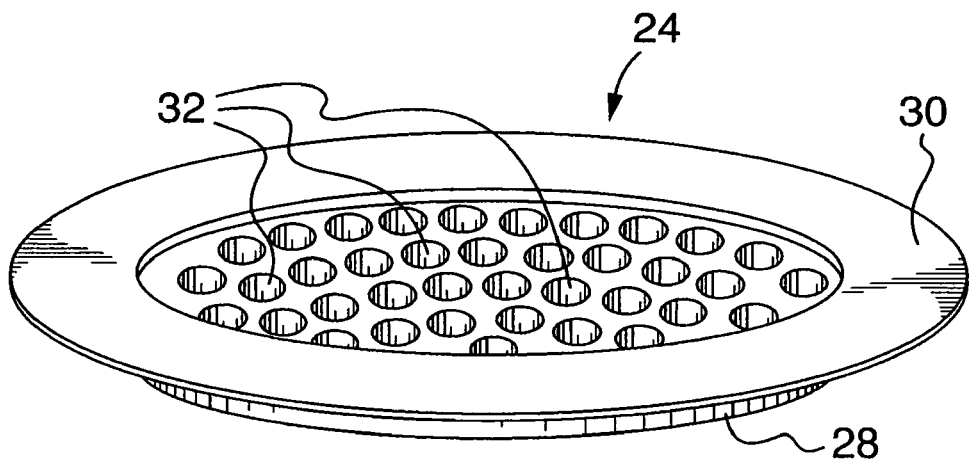
FIG. 2 is an isometric view of the lid of the embodiment shown in FIG. 1.
Figure 3:
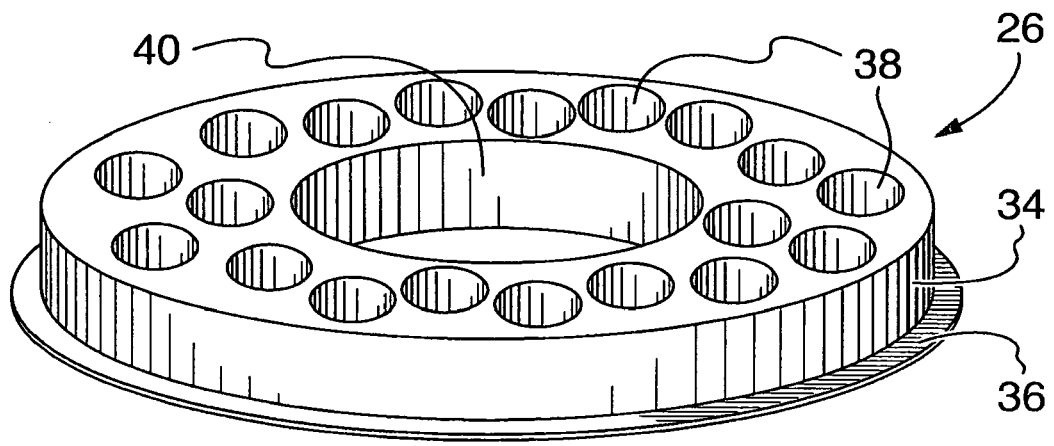
FIG. 3 is an isometric view of the exit grate of the embodiment shown in FIG. 2.

The filter/plug drain insert 20 includes a drain body 22, a lid 24 (shown in FIGS. 1 and 2) and an exit grate 26 (shown in FIGS. 1 and 3). Although the embodiments and components described herein and shown in the drawings are described and shown with the filter/plug drain insert 20 oriented vertically with the lid 24 at the top and the exit grate 26 at the bottom, the filter/plug drain insert 20 and the other embodiments described herein need not be oriented vertically. The filter/plug drain insert 20 and other embodiments may be used in any orientation and are expected to function as intended so long as in use the relevant liquid enters the filter/plug drain insert 20 via the lid 24 and, subject to plugging, exits via the exit grate 26.

The drain body 22 is cylindrical and has an internal bore. The drain body 22 in all the illustrated embodiments are cylindrical, but while the cylindrical form is standard, convenient and relatively inexpensive, other configurations could be used if desired, such as for example to better conform to the shape of a non-cylindrical drain. The drain body 22 is made from a material that is essentially impervious to water and to any other chemicals to which the user considers it possible that the filter/plug drain insert 20 will be exposed. Depending on the type of chemicals to which the filter/plug drain insert 20 may be exposed, a section of conventional commercially-available polyvinyl chloride (PVC) pipe may be used for the drain body 22.

The lid 24 includes a lid stub 28 for insertion into the drain body 22 and a lid flange 30 that abuts against the drain body 22 when the lid 24 is in its operational position (as shown in FIG. 1). The lid flange 30 extends beyond the exterior of the drain body 22 and is sized and configured to seat in the drain opening (not shown) in which the filter/plug drain insert 20 is inserted during use, so as to prevent liquid from bypassing the filter/plug drain insert 20. The lid 24 has a plurality of lid perforations 32 through which liquid may flow into the drain body 22 during use. For most applications, the lid 24 should be configured to support the weight of a person, should it be stepped on, and to impede the passage of relatively large items (e.g. leaves) without significantly impeding the flow of liquid into filter/plug drain insert 20. The lid 24 may be in the form of a grid or grate, with the lid perforations 32 being the openings therein.

The exit grate 26 includes an exit stub 34 for insertion into the drain body 22 and an exit flange 36 that abuts against the drain body 22 when the exit grate 26 is in its operational position (as shown in FIG. 1). The exit grate 26 has a plurality of exit perforations 38 and a central exit opening 40 through which liquid may flow out of the drain body 22 during use.

The lid 24 and/or exit grate 26 may be permanently attached to the drain body 22, such as with a suitable glue. Alternatively and preferably, the lid 24 and/or exit grate 26 may be removeably attached to the drain body 22 so that one or the other or both may be removed for refurbishing the filter/plug drain insert 20 by cleaning and/or replacing internal components as required. The lid 24 and exit grate 26 may be attached to the drain body with conventional fasteners such as screws or rivets (not shown).

As shown in FIG. 1, the following are interposed between the lid 24 and exit grate 26 within the drain body 22: upper plate 41, lower plate 42; upper spacer 43; middle spacer 44; lower spacer 45; circular barrier sheets 46; annular barrier sheets 48; tube-insert barrier sheets 50; filter pellets 54; filter/plug grains 56; and rapid plugging material 58.

Figure 4:
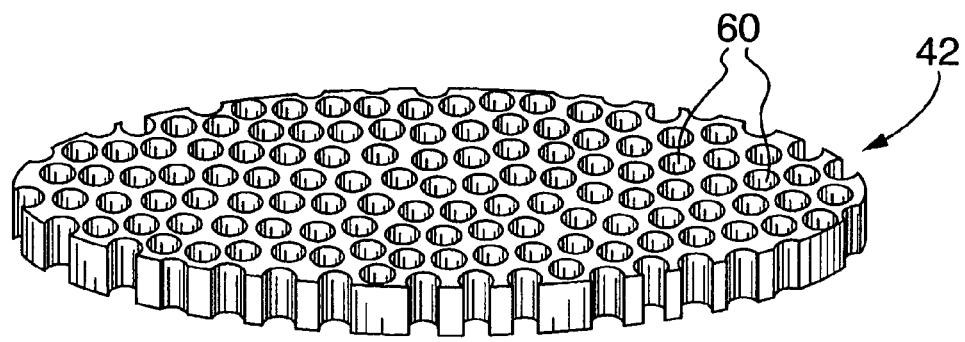
FIG. 4 is an isometric view of a plate of the embodiment shown in FIG. 1.

The plates 41, 42 are identical to one another. As shown in FIG. 4, each plate 41, 42 is a circular planar member. Each plate 41, 42 has a plurality of plate perforations 60 for permitting liquid to pass through the plate 41, 42. The external diameter of each plate 41, 42 is the same as or slightly less than the internal diameter of the drain body 22, such that in use the peripheral edge of each plate 41, 42 abuts the inner wall of the drain body 22.

Figure 5:
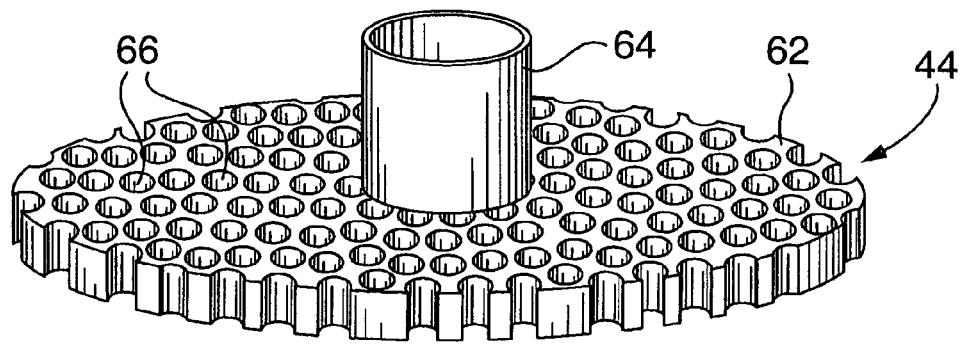
FIG. 5 is an isometric view of a spacer of the embodiment shown in FIG. 1.

The spacers 43, 44, 45 are identical to one another. As shown in FIG. 5, each spacer 43, 44, 45 comprises a planar divider member 62 and a tube 64 projecting from the divider member 62. The divider member 62 has a plurality of divider member perforations 66 through it for permitting liquid to pass through the divider member 62. The divider member 62 is circular and has an external diameter the same as or slightly less than the internal diameter of the drain body 22, such that in use at least portions of the peripheral edge of the divider member 62 abut the inner wall of the drain body 22. The tube 64 is cylindrical and is centered on the divider member 62. Preferably, for efficiency of manufacture, the divider members 62 are identical to the plates 41, 42.

Preferably, the plates 41, 42 and spacers 43, 44, 45 are made from a material selected to be essentially unaffected by the liquids expected to flow through the filter/plug drain insert 20. For many applications, PVC (polyvinyl chloride) is a suitable material for the plates 41, 42 and spacers 43, 44, 45, as PVC is relatively inexpensive, readily available and easy to work. The tubes 64 may be made from PVC pipe. The plates 41, 42 and divider members 62 may be made from PVC sheet material. Pre-perforated PVC sheet material suitable for the plates 41, 42 and divider members 62 is readily commercially available. Each tube 64 and respective divider member 62 may be attached one to the other with conventional PVC glue.

Figure 6:
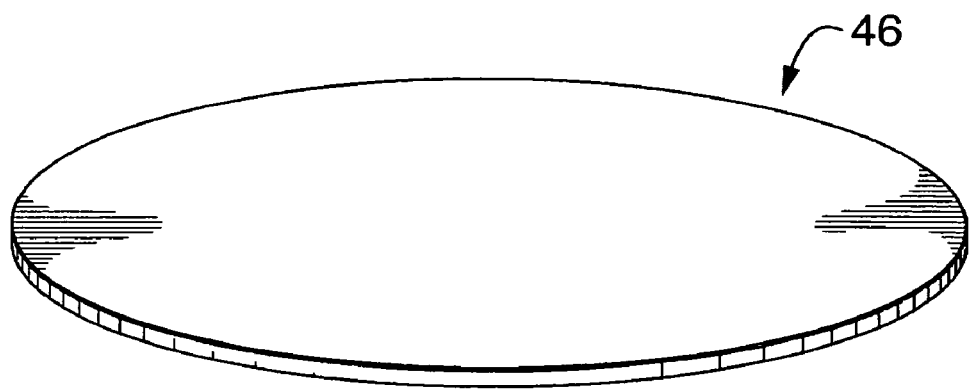
FIG. 6 is an isometric view of a circular barrier sheet of the embodiment shown in FIG. 1.

The barrier sheets 46, 48, 50 are liquid pervious and are intended to impede passage of particulates. A circular barrier sheet 46 is shown in FIG. 6. Each circular barrier sheet 46 has a diameter the same as or slightly less than the internal diameter of the drain body 22.

Figure 7:
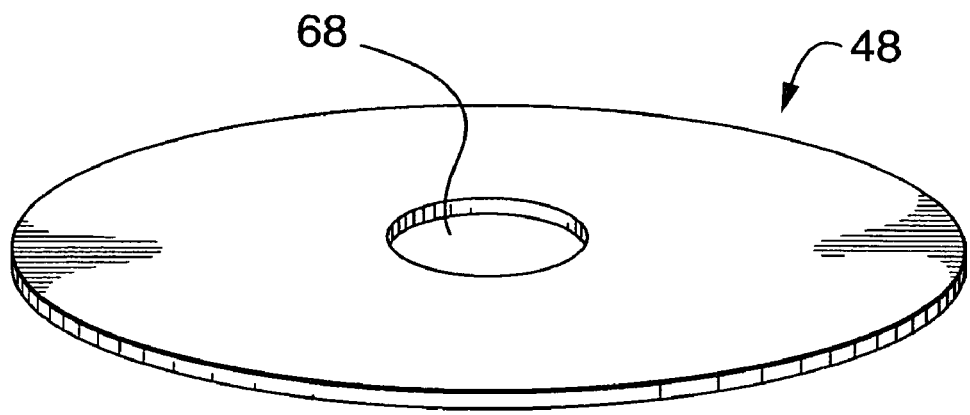
FIG. 7 is an isometric view of an annular barrier sheet of the embodiment shown in FIG. 1.

An annular barrier sheet is shown in FIG. 7. Each annular barrier sheet 48 has an external diameter the same as or slightly less than the internal diameter of the drain body 22. Each annular barrier sheet 48 has a central circular tube opening 68, having a diameter the same as or slightly greater than the external diameter of the tubes 64. In use, an annular barrier sheet 48 may be positioned so as to have a surface adjacent to a corresponding annular portion of the divider member 62 surface from which a tube 64 projects, by inserting the tube 64 into the tube opening 68.

Figure 8:
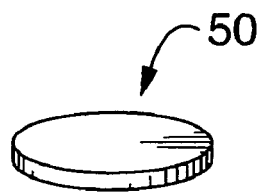
FIG. 8 is an isometric view of a tube-insert barrier sheet of the embodiment shown in FIG. 1.

A tube-insert barrier sheet 50 is shown in FIG. 8. Each tube-insert barrier sheet 50 is circular and has a diameter the same as or slightly less than the internal diameter of the tubes 64. In use, a tube-insert barrier sheet 50 may be inserted into a tube 64 so as to cover the portion of the surface of the associated divider member 62 that is within the tube 64.

In use, the circular barrier sheet 46, annular barrier sheet 48 and tube-insert barrier sheet 50, each has a surface adjacent to all or a corresponding part (in the case of the annular barrier sheet 48 and tube-insert barrier sheet 50) of a respective planar surface of a plate 41, 42 or divider member 62. The barrier sheets 46, 48 and 50 act to prevent plugging of the plate perforations 60 and divider member perforations 66 by particulate and other matter (particularly the granular particles of the filter/plug grains 56 and rapid plugging material 58, discussed below). The barrier sheets 46, 48 and 50 may also act to slow the flow of liquid through the filter/plug drain insert 20 as a whole and through each respective internal section of the filter/plug drain insert 20.

The barrier sheets 46, 48, 50 may be made from any suitable filter material that permits the passage of liquid but impedes the passage of particulates that could plug the plate perforations 60 and divider member perforations 66. Preferably, the barrier sheets 46, 48, 50 also have some ability to remove the target contaminant or contaminants (e.g. hydrocarbons or other chemicals) from the drain water. For embodiments for which the target contaminants are hydrocarbons, the barrier sheets 46, 48, 50 may be made from a non-woven pad material comprising delustered hydrophobic and lipophilic synthetic fibers. The X-Tex™ filtration fabric sold by the Xextex Corporation, USA, is an example of suitable such pad material. For some applications, it may be desirable for some or all of the barrier sheets 46, 48, 50 to be made from a pad material that also includes activated carbon (which is considered to be effective in removing polar and non-polar organics, and some inorganic metals). The X-TEX-AC-100™ pad material (sold by the Xextex Corporation, USA), incorporates a bed of activated carbon sandwiched between two layers of X-TEX™, and is an example of a suitable such pad material. Alternatively, the barrier sheets 46, 48, 50 may be made from non-woven pad material comprising polypropylene fibers.

The rapid plugging material 58 is selected to, when exposed to the target contaminant or contaminants, rapidly form a plug preventing the passage of liquid through the filter/plug drain insert 20.

The filter pellets 54 are selected to, when exposed to target contaminants in the drain water, trap the contaminants. Preferably, the filter pellets 54 will, under sheen conditions (i.e., for hydrocarbons, no more than roughly 50 to 100 ppm), trap at least roughly five times their weight of the target contaminants before permitting any of the contaminants to pass. Typically, the filter pellets 54 initially adsorb the target contaminants and then once exposed to a sufficient amount of the contaminants, the filter pellets 54 begin to absorb the contaminants.

The filter/plug grains 56 are selected to absorb trace amounts of contaminants in the drain water until a threshold contaminant content in the filter/plug grains 56 is reached, after which exposure to additional contaminants will cause the filter/plug grains 56 to form a plug relatively rapidly. The filter/plug grains 56 are selected to provide a plugging speed of reaction that is sufficiently slow to allow for the removal of trace amounts of the contaminants without plugging. Preferably, the filter/plug grains 54 will, under sheen conditions trap at least roughly five times their weight of the target contaminants before permitting any of the contaminants to pass and before commencing any significant plugging reaction.

As shown in FIG. 1, the spacers 43, 44, 45 are stacked within the drain body 22, oriented such that each tube 64 projects from the respective divider member 62 toward the lid 24. A circular barrier sheet 46 is interposed between each pair of adjacent spacers 43, 44, 45. The lower spacer 45 has a tube-insert barrier sheet 50 positioned to cover the surface of the respective divider member 62 within the tube 64. Each spacer 43, 44, 45 has an associated annular barrier sheet 48 positioned to cover the corresponding annular surface of the side of the divider member 62 from which the tube 64 projects.

Each spacer 44, the associated annular barrier sheet 48 and tube-insert barrier sheet 50 (if such is present); the circular barrier sheet 46 abutting the tube 64 of the spacer 44; and the internal wall of the drain body 22, bound and define a cylindrical central space within the tube 64 and an annular space outside of the tube 64.

For clarity, in what follows the different central spaces and annular spaces are described in terms of their relative positions as the filter/plug drain insert 20 is oriented in FIG. 1, that is, with the lid 24 at the top and the exit grate 26 at the bottom. However, the filter/plug drain insert 20 need not be oriented as shown in FIG. 1. Immediately below the lid 24, there is a top void 69, bounded by the inner wall of the drain body 22, the lid 24 and the upper plate 41. The top void 69 compensates for the flow restriction inherent in the filter/plug drain insert 20 (as compared to an unobstructed drain) in the case of small spill events, in that the liquid in a small spill would flow into the top void 69, rather than pooling on the ground around the drain as it could if the top void 69 were not present. Immediately below the upper plate 41, there is a full-width space, referred to herein as the plate space 70, bounded by the upper plate 41, lower plate 42 and inner wall of the drain body 22 stratum and containing a full-width stratum of filter pellets 54.

Below the lower plate there are annular and central spaces defined by the stacked spacers 43, 44, 45. The upper annular space 74 (that is, the annular space immediately below the plate space 70) contains filter/plug grains 56. The upper central space 76 (that is, the central space immediately below the plate space 70) contains filter pellets 54. The middle annular space 78 (that is, the annular space immediately below the upper annular space 74) contains filter/plug grains 56. The middle central space 80 (that is, the central space immediately below the upper central space 76) contains filter pellets 54. The bottom annular space 82 (that is, the annular space immediately below the middle annular space 78) contains rapid plugging material 58. The bottom central space 84 (that is, the central space immediately below the middle central space 80) contains rapid plugging material 58.

The configuration of the spacers 43, 44, 45 facilitates assembly of the filter/plug drain insert 20. Each tube 64 provides a convenient depth gauge indicating when the desired quantity of the respective material 54, 56, 58 is in place within the respective annular space 74, 78, 82 or respective central space 76, 80, 84. As well, the stacked arrangement of spacers 43, 44, 45, impedes compaction of the filter/plug grains 56 and rapid plugging material 58 that perhaps would occur if the upper strata were not supported by the spacers 43, 44, 45. Compaction of the filter/plug grains 56 and rapid plugging material 58 is generally undesirable as a compacted material will tend to restrict the flow of liquid through the filter/plug drain insert 20 more than the same material would when uncompacted. In the embodiment shown in FIG. 1, the material used in the top stratum, the filter pellets 54, is not prone to compacting and the filter pellets 54 support the upper plate 41.

Preferably, the size, shape and number of lid perforations 32 and exit perforations 38, and the size and configuration of the central exit opening 40, are empirically determined to provide, in cooperation with the other components of the filter/plug drain insert 20, a flow rate through the filter/plug drain insert 20 that is high enough to achieve a desired water drainage rate. The filter pellets 54, filter/plug grains 56 and rapid plugging material 58 themselves slow the flow of liquid through the filter/plug drain insert 20, and if properly selected, are expected to ensure that no measurable amounts of contaminants pass through the filter/plug drain insert 20. Therefore, it has been found to generally not be necessary to limit the size and number of lid perforations 32 and exit perforations 38, and the size of the central exit opening 40, so as to limit the flow through the filter/plug drain insert 20. Generally, the lid perforations 32, exit perforations 38 and central exit opening 40 should permit at least the same flow rate as the filter pellets 54, filter/plug grains 56 and rapid plugging material 58.

The applicants understand that for most conventional applications (such as for example, in a transformer area enclosed by a berm), a flow rate through the drain insert 20 (prior to exposure to the target contaminants) of less than roughly 13 liters/hour/square inch of lateral cross sectional area of the interior of the drain insert, would not be acceptable to end users.

In use, when installed in a drain, the filter/plug drain insert 20 permits uncontaminated water to flow relatively freely. The filter/plug drain insert 20 may be exposed to drain water having only low levels or trace amounts of the target contaminant or contaminants (referred to as, "sheen"), or, in the case of a major spill, may be exposed to liquid almost wholly comprised of the target contaminant.

In sheen conditions, the contaminants will first be adsorbed by the filter pellets 54 in the plate space 70. If the concentration of the contaminants is sufficiently high and/or if the sheen condition is sufficiently prolonged, the filter pellets 54 will begin to absorb the contaminants. Once the filter pellets 54 in the plate space 70 are saturated, that is, once the filter pellets 54 in the plate space 70 can no longer adsorb or absorb additional amounts of the contaminants, or can only adsorb or absorb at a reduced rate; the contaminants will begin to be carried by the drain water to the upper annular space 74 and upper central space 76. The upper annular space 74 contains filter/plug grains 56 and the upper central space 76 contains filter pellets 54. When water containing low levels of contaminants passes from the plate space 70 into the upper annular space 74 and upper central space 76, the filter/plug grains 56 in the upper annular space 74 and the filter pellets 54 in the upper central space 76 will initially adsorb the contaminants and then will begin to absorb the contaminants. If the sheen condition continues, such that the filter/plug grains 56 in the upper annular space 74 and the filter pellets 54 in the upper central space 76 become saturated, the contaminants will be carried by the drain water into the middle annular space 78 and middle central space 80, where the contaminants will be adsorbed and eventually absorbed by the filter pellets 54 and filter/plug grains 56 present in those spaces 78, 80. Once the filter/plug grains 56 are saturated, as well as commencing to permit contaminants to pass, the filter/plug grains 56 commence a plugging reaction. As the upstream filter/plug grains 56 (i.e. those in the upstream portion of the upper annular space 74) are the first of the filter/plug grains 56 to be exposed to the contaminants, they are also the first to become saturated and the first to commence a plugging reaction. Depending, among other things, on the concentration of the contaminant, it may be that the plugging reaction in the upstream filter/plug grains 56 occurs prior to any of the contaminants passing through the filter/plug grains 56 in the upper central space 76 and middle central space 80 to the rapid plugging material 58 in the bottom central space 84 (which would trigger a rapid plugging reaction in the bottom central space 84). If such is the case, there is a period of time during which the flow path comprising the annular spaces 74, 78, 82 is blocked (at the upstream filter/plug grains 56) and the flow path comprising the central spaces 76, 80, 84 is not blocked. Effectively, when this occurs, the flow through the filter/plug drain insert 20 is throttled down, resulting in a noticeable reduction of the flow rate which indicates that the filter/plug drain insert 20 should be inspected, and replaced or refurbished; and, if the user was not otherwise aware of this, that low levels of the target contaminants are or were present in the drain water. If the filter/plug drain insert 20 is not replaced or refurbished and the sheen conditions continue, the filter pellets 54 in the upper central space 76 and middle central space 80 will eventually become saturated, and will permit contaminants to pass into the bottom central space 84 triggering a plugging reaction in the rapid plugging material 58 contained therein, thus (along with the plug formed by the upstream filter/plug grains 56) blocking the drain insert 20.

The circular barrier sheets 46 interposed between the spacers 43, 44, 45 provide a fluid flow path between each associated pair of annular spaces 74, 78, 82 and central spaces 76, 80, 84. For example, the circular barrier sheet 46 at the top of the middle annular space 78 and the middle central space 80, provides a flow path between them. Therefore, in the event that the upper annular space 74 is plugged, and the central spaces 76, 80, 84 and other annular spaces 78, 82 are not plugged, drain water (with or without the target contaminant) flowing through the upper central space 76 will flow into the middle central space 80 and possibly into the middle annular space 78 via the circular barrier sheet 46. The alternative flow paths provided by the circular barrier sheets 46 permit the redirection of drain water within the filter/plug drain insert 20 to spaces that may not have otherwise been exposed to the contaminants, thus the availability of alternative flow paths tends to promote the full utilization of each space 74, 76, 78, 80, 82, 84 and associated filter pellets 54, filter/plug grains 56 or rapid plugging material 58. This contributes to the ability of the filter/plug drain insert 20 to provide a measured response to low levels of contaminants, in that low levels of contaminants do not result in immediate blockage of the drain. Rather, low levels of contaminants result in a constriction of the drain that increases overtime, typically providing the user with an opportunity to stop the contaminant from entering the drain water and to replace or refurbish the filter/plug drain insert 20, before the drain is completely blocked.

When the filter/plug drain insert 20 is exposed to liquid containing a high proportion of the target contaminant or contaminants (such as in the case of a major spill, where the liquid may be wholly comprised of contaminants), the filter/plug drain insert 20 will be rapidly blocked, with minimal or no contaminant passing through before the blockage occurs. Typically, with the onslaught of liquid containing a high proportion of contaminants, the filter pellets 54 and filter/plug grains 56 adsorb and absorb some but not all of the contaminants, but do not prevent some contaminants from reaching the rapid plugging material 58. However, a plugging reaction is triggered in the rapid plugging material 58 almost immediately on contact with the contaminants, preventing the contaminants from passing through the filter/plug drain insert 20. In situations of exposure to high levels of contaminants, the filter/plug grains 56 will also form plugs, which usually merely augment the plug formed more quickly by the rapid plugging material 58.

In some cases, a material having adsorption and absorption characteristics that make it suitable for use as a filter material (e.g. the filter pellets 54), may also have a plugging reaction. So long as the plugging reaction of the material is slow, at least slower than the plugging reaction of the filter/plug material (e.g. the filter/plug grains 56) and preferably much slower, the plugging reaction will not disqualify the material for use as a filter material. Under sheen conditions, a filter material that also slowly plugs, may in some circumstances still provide the throttling effect described above, in that so long as there is a plugging rate differential between the filter material and the filter/plug material, the flowpath comprising the filter/plug material (in the embodiment shown in FIG. 1, the upper annular space 74, middle annular space 78 and bottom annular space 82) will plug before the flowpath comprising the filter material (in the embodiment shown in FIG. 1, the upper central space 76, middle central space 80 and bottom central space 84), since the upstream filter/plugging material will plug before the upstream filter material.

Positioning each tube 64 in the center of its respective divider member 62, ensures that, regardless of how each spacer 44 is rotated about the longitudinal axis of its respective tube 64, the tubes 64 in the stacked spacers 44 will be essentially aligned within the drain body 22. Thus, the spacers provide two distinct flow paths, albeit in fluid communication via the circular barrier sheets 46, a flow path through the central spaces 76, 80, 84 and another through the annular spaces 74, 78, 82. The provision of two flow paths permits the user to select alternative/complementary filter/slow-plug material (or filtering material, discussed further below), filter/plug material and rapid plugging material. Although in the embodiment described above, the filtering material (the filter pellets 54) is located in the central spaces 76, 80 and the filtering/plugging material (the filter/plug grains 56) is located in the annular spaces 74, 78, the locations could be reversed.

The stacking of the spacers 44 permits a stratification of filtering, filtering/plugging and plugging material, that, along with the provision of two distinct flow paths, enables the user to configure the filter/plug drain insert 20 for an optimum response to a targeted contaminant, by selecting appropriate filter material (discussed below with respect to alternative embodiments), filter pellets 54, filter/plug grains 56 and rapid plugging material 58, and appropriate relative amounts of same. The user may control the quantity of each of the filtering, filtering/plugging and plugging material, by stacking as many spacers 43, 44, 45 as needed and/or by having spacers 43, 44, 45 with tubes 64 of different lengths (though for efficiency of manufacture, a uniform tube length is generally preferable).

Clearly, the selection of the materials making up the filter pellets 54, filter/plug grains 56 and rapid plugging material 58 is significant in determining the filtering efficacy and/or plugging rate of the filter pellets 54, filter/plug grains 56 and rapid plugging material 58. For example, filter pellets 54, filter/plug grains 56 and rapid plugging material 58 made from selected styrenic block copolymers have been found to be suitable filter/plug drain inserts targeted at hydrocarbon contaminants.

The size and shape of the particles, and method of their forming also affect filtering efficacy and plugging rate. Typically, the greater the total available surface area of the particles, the more contaminants they adsorb and the more quickly they absorb contaminants so as to trigger a plugging reaction. Similarly, the shape of the particles affects the total available surface area, with spherical particles having a lower surface area to volume ratio than irregularly shaped particles. Further, the relative smoothness, density and porosity of the surface of the particles will affect the filtering efficacy and plugging rate. For example, particles made by heating the relevant constituent components to liquify them, then extruding the molten mixture through a pelletiser to form pellets and then immersing the pellets in water to cool, tend to be spheroidal and have a relatively smooth and dense surface skin that is less pervious to liquid than the material comprising the interior of the pellet. By contrast, particles produced by spray drying tend to be small, porous and irregularly-shaped.

The factors to be considered when selecting materials suitable for use as filter material, filter/plug material or plugging material in the drain insert 20, are whether: the material is unaffected by water before and after exposure to the target contaminant (and other substance expected to be in the drain water); the material reacts as desired when exposed to the target contaminant (i.e. it filters, forms a plug or both); the reaction occurs at an appropriate speed; and there are any dangerous reactions or products.

To test whether a candidate material is suitable for use as filter material, filter/plug material or plugging material for a target hydrocarbon, a small sample of the candidate material was placed in a container and the target hydrocarbon was added until the candidate material is essentially saturated, that is, it ceased to rapidly take up the target hydrocarbon. For materials that were ultimately considered to be suitable for use with a particular target hydrocarbon, this typically occurred within several seconds. The state of the candidate material/target contaminant combination was evaluated at 1 minute, 10 minute and 24 hour intervals through visual observation and physical manipulation.

When testing to determine whether selected styrenic block copolymers were suitable for use as filter material, filter/plug material or plugging material for a target hydrocarbon, results indicating that the material would be suitable included the following:
  a) for a plugging material:
    i) at 1 minute, an essentially impermeable plug would have formed, which could be hard or solid, rubbery or spongy, or similar to sticky cooked rice;
    ii) at 10 minutes, the plug would be stable or would have become more solid; and
    iii) at 24 hours, the plug would be stable or would have become more solid;
  b) for a filter/plug material:
    i) at 1 minute, the material is permeable; the material has absorbed all of the added target contaminant and may be able to absorb more over time; the surfaces of the constituent particles of the material may be sticky and there may be some clumping of the particles;
    ii) at 10 minutes, the material is still permeable and preferably still absorbent, though the constituent particles may be more sticky and there may be more clumping; and
    iii) at 24 hours, the material is still permeable and preferably still absorbent; the constituent particles may be more sticky and there may be more clumping, but they have not formed a solid; and
  c) for a filter material:
    i) at 1 minute, the material is permeable, with minimal change to the surfaces of the constituent particles (i.e. a minimal increase in "stickiness");
    ii) at 10 minutes, the material is essentially stable, in that it is permeable and the surfaces of the constituent particles are essentially unchanged; and
    iii) at 24 hours, the material is essentially stable, in that it is permeable and the surfaces of the constituent particles are essentially unchanged.

In some cases, different mixtures of two or more styrenic block copolymers may provide the desired characteristics for each of the filter material, filter/plug material and plugging material. For example, a candidate material for a plugging material that reacts when exposed to the target hydrocarbon by rapidly forming a solid, but permeable (due to internal voids), agglomeration may be combined with another material that initially reacts to the target hydrocarbon by forming a syrupy plug, in that a mixture of these materials would form a suitable plug, with the first material providing a solid framework for the plug and the second material filling and sealing the voids within the framework.

In an exemplary embodiment of the filter/plug drain insert 20 targeted at the oil used in electrical transformers (commonly referred to as transformer oil):
  a) the filter pellets 54 consist of a 50:50 mixture of:
    i) a pelletized two-component mixture comprising:
      A) 60% a styrene-ethylene/butylene-styrene copolymer (conventionally referred to by the acronym SEBS) comprising 30% a linear, 0% diblock, copolymer of styrene and 70% ethylene/butylene rubber (Kraton™ G1650 or equivalent); and
      B) 40% polypropylene; and
    ii) a pelletized SEBS comprising 30% a linear, 70% diblock, copolymer of styrene and 70% ethylene/butylene rubber (Kraton™ G1726 or equivalent);
  b) the filter/plug grains 56 consist of a granular three-component mixture comprising:

i) 45% a styrene-ethylene/propylene copolymer (conventionally referred to by the acronym SEP) comprising 37% a 100% diblock copolymer of styrene and 63% ethylene/propylene rubber (Kraton™ G1701 or equivalent);

ii) 20% a SEBS comprising 30% a linear, 0% diblock, copolymer of styrene and 70% ethylene/butylene rubber (Kraton™ G1650 or equivalent); and iii) 35% a SEBS comprising 31% a linear, 0% diblock, copolymer of styrene and 69% ethylene/butylene rubber (Kraton™ G1654 or equivalent); and c) the rapid plugging material 58 consists of a two-component mixture of granular copolymers comprising:

i) 50% a SEP comprising 37% a 100% diblock copolymer of styrene and 63% ethylene/propylene rubber (Kraton™ G1701 or equivalent); and ii) 50% a SEBS comprising 30% a linear, 0% diblock, copolymer of styrene and 70% ethylene/butylene rubber (Kraton™ G1650 or equivalent).

Each of the individual materials making up the above filter pellets 54, filter/plug grains 56 and rapid plugging material 58 for use with transformer oil, was tested using the testing procedure outlined above. The materials (identified below primarily by their Kraton™ product numbers for convenience) were observed to perform as follows:

a) Kraton™ G1650:
i) at 1 minute—all oil is easily absorbed; has the appearance of wet sugar; slightly sticky to the touch;
ii) at 10 minutes—material is a somewhat loose sticky mass; not a solid plug; and
iii) at 24 hours—fairly good rubbery plug formed made of relatively loose grains that can easily be pulled apart though;

b) Kraton™ G1654:
i) at 1 minute—all oil has been easily absorbed; has the appearance of wet sugar; slightly sticky to the touch;
ii) at 10 minutes—no change; and
iii) at 24 hours—no change; all oil remains contained, but material is loose, not a solid plug;

c) Kraton™ G1701:
i) at 1 minute—all oil absorbed-material has turned "soupy" and "syrupy"; not a solid plug;
ii) at 10 minutes—similar to material at 1 minute; somewhat gummy;
iii) at 24 hours—wet and syrupy plug; and d) Kraton™ G1726:
i) at 1 minute—no plugging; appears that some slight swelling of pellets may be occurring;
ii) at 10 minutes—pellets swollen and starting to stick together; and
iii) at 24 hours—good hard solid plug and d) the pelletized mixture comprising 60% Kraton™ G1650 and 40% polypropylene:
i) at 1 minute—pellets suspended in oil; no change to pellets;
ii) at 10 minutes—slight swelling of pellets; and
ii) at 24 hours—pellets swollen and sticking together, but can be easily pulled apart from each other.

Similar testing of candidate materials was used in the selection of the following filter pellets 54, filter/plug grains 56 and rapid plugging material 58 for an exemplary embodiment of the filter/plug drain insert 20 targeted at conventional vehicle fuels (diesel and gasoline):

a) the filter pellets 54 consist of a pelletized SEBS comprising 30% a linear, 70% diblock, copolymer of styrene and 70% ethylene/butylene rubber (Kraton™ G1726 or equivalent);

b) the filter/plug grains 56 is a granular two-component mixture comprising:

i) 3 parts a SEBS comprising 31% a linear, 0% diblock, copolymer of styrene and 69% ethylene/butylene rubber (Kraton™ G1654 or equivalent); and ii) 1 part a SEP comprising 37% a 100% diblock copolymer of styrene and 63% ethylene/propylene rubber (Kraton™ G1701 or equivalent); and c) the rapid plugging material 58 consists of a three-component mixture comprising:

i) 1 part a pelletized SEBS comprising 30% a linear, 70% diblock, copolymer of styrene and 70% ethylene/butylene rubber (Kraton™ G1726 or equivalent);

ii) 2 parts a granular styrene-butadiene-styrene copolymer (conventionally referred to by the acronym SBS) comprising 31% a linear, 16% diblock, copolymer of styrene and 69% ethylene/butadiene (Kraton™ D1101 or equivalent); and iii) 2 parts a SEBS comprising 33% a linear, 0% diblock, copolymer of styrene and 67% ethylene/butylene rubber (Kraton™ G1651 or equivalent).

The filter pellets 54 of each of the above-described transformer-oil-targeted and vehicle-fuels-targeted embodiments of the drain insert 20, are of the sort that as well as filtering the target contaminant also have a slow plugging reaction (as described generally above). As the filter pellets 54 of these embodiments absorb contaminants, they gradually swell and as they continue to absorb more contaminants they may eventually swell sufficiently to fill the interstitial spaces between the filter pellets 54, thus impeding further flow of liquid through the filter pellets 54.

Figure 9:
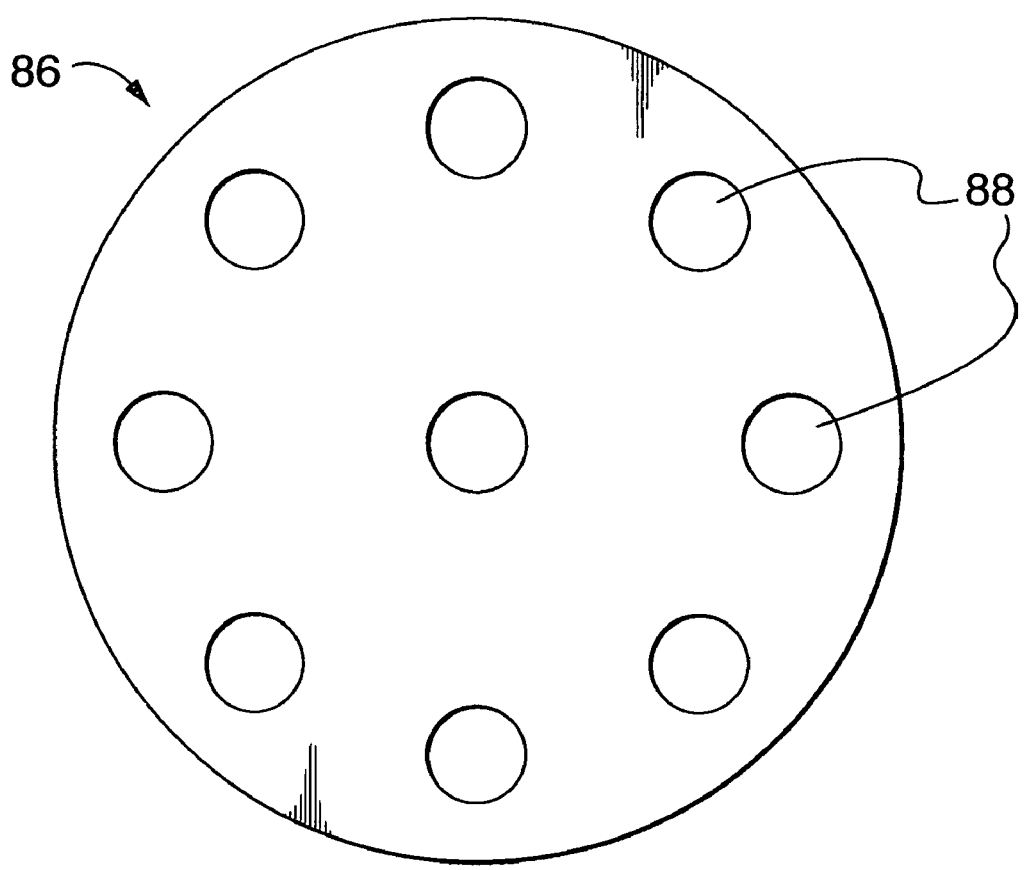
FIG. 9 is a schematic top plan view of a drain cover for mounting a plurality of the filter/plug drain insert embodiment of FIG. 1, in a large drain

FIG. 9 shows a drain cover 86 for mounting a plurality of filter/plug drain inserts 20 in a large drain opening, such as where the drain opening is large enough for a person to enter the drain for inspection or other purposes. The drain cover 86 has a plurality of receptacles 88, each for receiving and supporting a filter/plug drain insert 20. Although filter/plug drain inserts 20 could be made large enough that a single filter/plug drain insert 20 would fit a large drain opening, this would generally not be desirable, as usually, the size of such large drain openings does not reflect the expected flow through the drain, and it is more efficient to manufacture a standard size or relatively small number of sizes of filter/plug drain inserts 20 conforming to standard drains, and to accommodate unusually sized or shaped drains with a suitable drain cover 86.

FIGS. 10 and 11 show a bendable filter/plug drain insert 90. The bendable filter/plug drain insert 90 has the same components as the filter/plug drain insert 20, except that the bendable filter/plug drain insert 90 has a flexible drain body 91. Preferably, the flexible drain body 91 is made from a section of flexible hose made from a material that is essentially impervious to water and to any other chemicals to which the user considers it possible that the bendable filter/plug drain insert 90 will be exposed.

As shown in FIG. 11, as the spacers 43, 44, 45 and the plates 41, 42 are free floating, in that they are not attached one to the other or to the flexible drain body 91, they can shift relative to each other and the flexible drain body 91, so as to permit the bendable filter/plug drain insert 90 to bend as needed for use in drains having bends proximate to the drain opening.

Other embodiments of the present invention include those having: a fibrous filter material 92; more or less than four strata (a stratum is a layer of fibrous filter material 92, filter pellets 54, filter/plug grains 56 and/or rapid plugging material 58 between adjacent divider members 62, between a divider member 62 and an adjacent plate 42, between adjacent plates 41, 42 or between a plate 41 and the lid 24); and/or having tubes of different sizes (and thus strata of different thicknesses).

FIG. 12 shows a five-strata filter/plug drain insert 93 having fibrous filter material 92 in the upper two strata. A suitable fibrous filter material 92 for use with hydrocarbons is a cohesive wad of delustered hydrophobic and lipophilic synthetic fibers. X-Tex™ loose material (sold by the Xextex Corporation, USA), is an example of a suitable material of this type. X-Tex™ loose material is purported to adsorb up to 10 times its weight in oil.

The upper annular space 74, upper central space 76, middle annular space 78, middle central space 80, bottom annular space 82 and bottom central space 84 of the five-strata filter/plug drain insert 93 are essentially identical to those in the previously described filter/plug drain insert 20 and similarly contain filter pellets 54, filter/plug grains 56 and rapid plugging material 58.

Above the upper annular space 74 and upper central space 76 of the five-strata filter/plug drain insert 93, there is a filter spacer 94 (defining a filter annular space 95 and a filter central space 96) and a filter plate 97. The annular space 95 and filter central space 96 both contain fibrous filter material 92. The filter spacer 94 supports the filter plate 97 so as to prevent compression of the fibrous filter material 92. Suitable fibrous filter material 92 tends to be readily compressible, and when compressed undesirably impedes the flow of liquid through the five-strata filter/plug drain insert 93. Between the lid 24 and filter plate 97, there is a top filter space 98 containing fibrous filter material 92.

In use, when the five-strata filter/plug drain insert 93 is exposed to drain water having only trace amounts of the target contaminant (or contaminants), such trace amounts are initially adsorbed by the fibrous filter material 92, first in the top filter space 98 and then, as the fibrous filter material 92 in the top filter space 98 approaches saturation (that is, the fibrous filter material 92 in the top filter space 98 ceases adsorbing all of the contaminant present in the drain water), in the filter annular space 95 and the filter central space 96. Once the fibrous filter material 92 in the filter annular space 95 and the filter central space 96 approaches saturation, trace amounts of the contaminants will begin to pass to the next downstream stratum (the filter pellets 54 and filter/plug grains 56 contained in the upper annular space 74 and upper central space 76). The strata downstream of the filter annular space 95 and the filter central space 96 are essentially identical to the three bottom/downstream strata of the filter/plug drain insert 20 and would react to trace amounts of contaminants as previously described.

In use, when the five-strata filter/plug drain insert 93 is exposed to liquid containing a high proportion of the target contaminant (such as in the case of a major spill, where the liquid may be wholly comprised of the target contaminant), the fibrous filter material 92, in the top filter space 98, the filter annular space 95 and the filter central space 96 quickly becomes saturated, and then permits the contaminated liquid to flow therethrough. The strata downstream of the filter annular space 95 and the filter central space 96 are essentially identical to the three bottom/downstream strata of the filter/plug drain insert 20 and would react to large amounts of contaminants as previously described.

FIG. 13 shows a bendable five-strata filter/plug drain insert 99. The bendable five-strata filter/plug drain insert 99 has the same components as the five-strata filter/plug drain insert 93, except that the bendable five-strata filter/plug drain insert 99 has a flexible drain body 91. Preferably, the flexible drain body 91 is made from a section of flexible hose made from a material that is essentially impervious to water and to any other chemicals to which the user considers it possible that the bendable filter/plug drain insert 90 will be exposed.

As shown in FIG. 13, as the spacers 43, 44, 45 and the plates 41, 42 are free floating, in that they are not attached one to the other or to the flexible drain body 91, they can shift relative to each other and the flexible drain body 91, so as to permit the bendable filter/plug drain insert 90 to bend as needed for use in drains having bends proximate to the drain opening.

Figure 14:
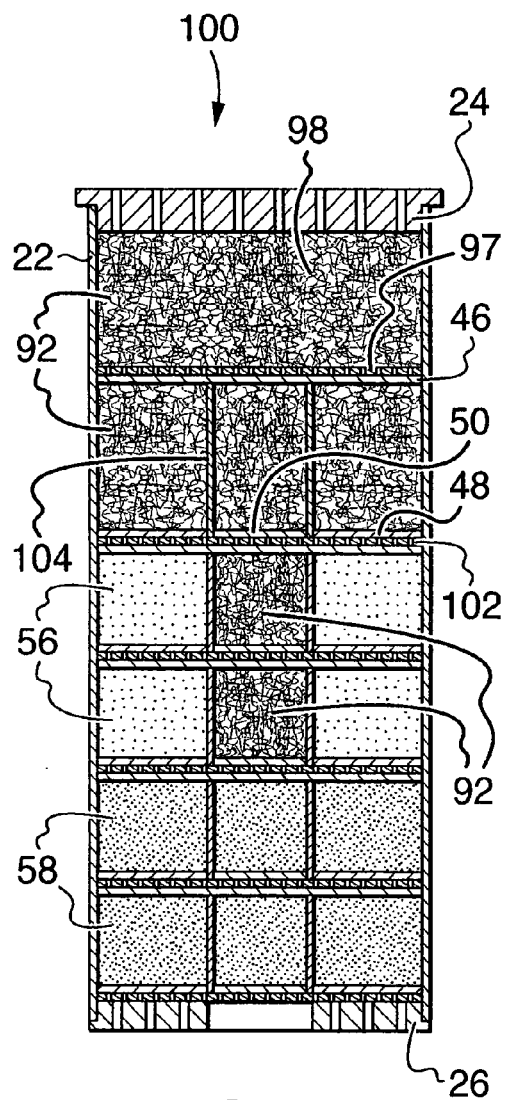
FIG. 14 is a schematic sectional elevation view of a double-rapid-plugging-strata drain insert embodiment of the present invention having six strata, two of which are rapid plugging material.

A double-rapid-plugging-strata drain insert 100 having six strata (two of which comprise rapid plugging material 58) and a large spacer 102, is shown in FIG. 14. The large spacer 102 is at the top of the stack of spacers 44. The large spacer 102 has a large tube 104, that is roughly 50% longer than the tubes 64 of the other spacers 44, thus creating spaces (within and outside the large tube) for the second-from-the-top stratum of fibrous filter material 92 roughly 50% larger than the spaces downstream of the large spacer 102. The two top/upstream strata and the central spaces of the two middle strata, contain fibrous filter material 92. The annular spaces of the two middle strata contain filter/plug grains 56. The two bottom/downstream strata contain rapid plugging material 58.

Figure 15:
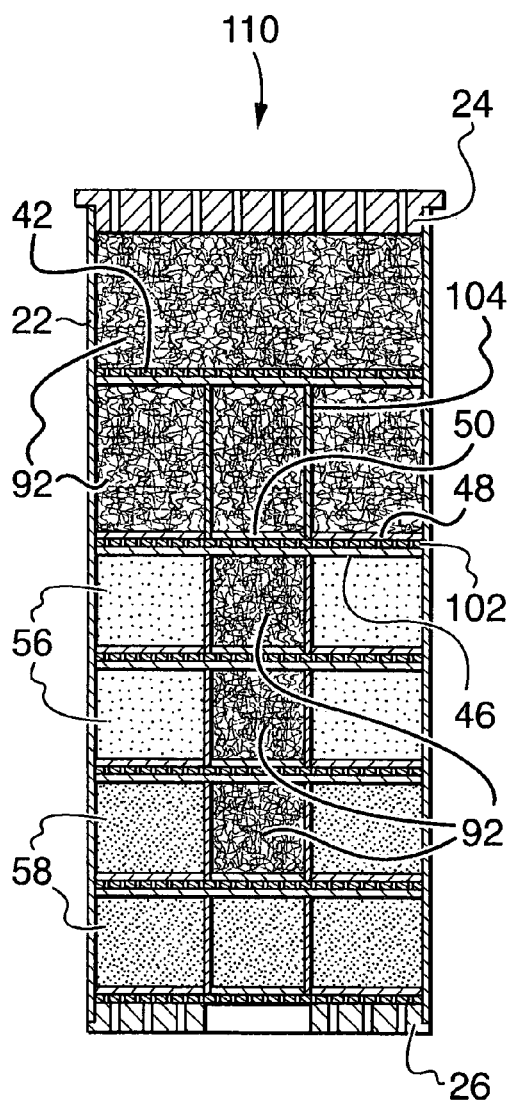
FIG. 15 is a schematic sectional elevation view of a central-filter drain insert embodiment of the present invention having six strata, one of which contains filter material in the central space and rapid plugging material in the annular space.

A central-filter drain insert 110 having six strata and a large spacer 102, is shown in FIG. 15. The top/upstream two strata; the central spaces of the middle two strata; and the central space of the second stratum from the bottom/downstream end, contain fibrous filter material 92. The annular spaces of the middle two strata contain filter/plug grains 56. The annular space of the second stratum from the bottom/downstream end, and the bottom/downstream strata contain rapid plugging material 58.

A bypass drain insert 120, having six strata, a large spacer 102, and a projecting bypass pipe 122, is shown in FIG. 16. The projecting bypass pipe 122 passes through aligned holes in the lid 24; plate 42; divider member 62 of the large spacer 102; and divider members 62 of the upper spacer 43 and middle spacer 44. The top/upstream end of the projecting bypass pipe 122, projects from the lid 24. The bottom/downstream end of the projecting bypass pipe 122 abuts the divider member 62 of the lower spacer 45. Located within the bottom/downstream end of the projecting bypass pipe 122, there is, fibrous filter material 92 and, upstream of the fibrous filter material 92, rapid plugging material 58. The two top/upstream strata and the central spaces of the two middle strata, contain fibrous filter material 92. The annular spaces of the two middle strata contain filter/plug grains 56. The two bottom/downstream strata contain rapid plugging material 58.

If, during use, the internal portion of the bypass drain insert 120 outside of the projecting bypass pipe 122 becomes blocked, and the liquid thereby prevented from draining rises to the level of the top of the projecting bypass pipe 122, the liquid will flow into the projecting bypass pipe 122. If the liquid does not contain the target contaminants, such as may occur if the blockage results otherwise than from exposure to a target contaminant (for example if the bypass drain insert 120 silts up); or if the blockage is the result of a transient release of a target contaminant that is wholly adsorbed and absorbed by the fibrous filter material 92, filter/plug grains 56 and rapid plugging material 58, and the liquid subsequently flowing to the drain is contaminant free), the liquid will flow through the bypass drain insert 120 via the projecting bypass pipe 122. However, if the liquid contains a target contaminant, the rapid plugging material 58 will form a plug, blocking the projecting bypass pipe 122.

A capped-bypass drain insert 130, having six strata, a large spacer 102, and a capped bypass pipe 132, is shown in FIG. 17. The capped bypass pipe 132 passes through aligned holes in the plate 42; divider member 62 of the large spacer 102; and divider members 62 of the upper spacer 43 and middle spacer 44. The top/upstream end of the capped bypass pipe 132, is located within the top/upstream stratum, between the plate 42 and the lid 24. The top/upstream end of the capped bypass pipe 132 has a cap 134 that prevents liquid from flowing directly down into the bypass pipe 132, but permits liquid to flow laterally into the capped bypass pipe 132. The bottom/downstream end of the capped bypass pipe 132 abuts the divider member 62 of the lower spacer 45. Located within the bottom/downstream end of the capped bypass pipe 132, there is, fibrous filter material 92 and, upstream of the fibrous filter material 92, rapid plugging material 58. The two top/stream strata and the central spaces of the two middle strata, contain fibrous filter material 92. The annular spaces of the two middle strata contain filter/plug grains 56. The two bottom/downstream strata contain rapid plugging material 58.

If during use, normal flow through the capped-bypass drain insert 130 is unimpeded by partial or total blockage of the flowpaths outside the capped bypass pipe 132, liquid flowing into the capped-bypass drain insert 130 will be prevented from flowing into the capped bypass pipe 132 by the cap 134. If during use, the internal portion of the capped-bypass drain insert 130 outside of the capped bypass pipe 132 becomes blocked, and the liquid thereby prevented from draining rises within the capped-bypass drain insert 130 to the level of the cap 134, the liquid will flow into the capped bypass pipe 132. If the liquid does not contain the target contaminants (such as may occur if the blockage results otherwise than from exposure to a target contaminant (for example if the capped-bypass drain insert 130 silts up); or if the blockage is the result of a transient release of a target contaminant that is wholly adsorbed and absorbed by the fibrous filter material 92, filter/plug grains 56 and rapid plugging material 58, and the liquid subsequently flowing to the drain is contaminant free), the liquid will flow through the capped-bypass drain insert 130 via the capped bypass pipe 132. However, if the liquid contains a target contaminant, the rapid plugging material 58 will form a plug, blocking the capped bypass pipe 132.

The invention claimed is:

1. A filter/plug drain assembly for use in containing spills of one or more selected liquid contaminants; the filter/plug drain assembly having a flowpath comprising a stack of layers of filtering, filtering/plugging and plugging material, the filtering material being located upstream of the filtering/plugging material and the filtering/plugging material being located upstream of the plugging material, the filtering material passing water but impeding the passage of the selected contaminants; the filtering/plugging material passing water but impeding the passage of selected contaminants when low levels of contaminants are present in the water, and forming a plug when exposed to sufficient amounts of contaminants; and the plugging material forming a liquid-blocking plug when exposed to any of the selected contaminants.

2. The filter/plug drain assembly of claim 1, further comprising a second flowpath comprising a stack of layers of material, including a downstream layer of plugging material, and one or both of filtering and filtering/plugging material; the second flowpath configured to provide a plugging response different from that provided by the first flowpath, wherein, when the drain water contains low levels of contaminants, the material in one flowpath tends to form a liquid-blocking plug before the material in the other flowpath.

3. The filter/plug drain assembly of claim 2, wherein the second flowpath consists essentially of a stack of layers of filtering material and plugging material, the filtering material being located upstream of the plugging material.

4. The filter/plug drain assembly of claim 1, further comprising:
  a) a drain body having an internal bore;
  b) a plurality of spacer elements stacked within the internal bore, each spacer element having:
    i) a permeable laterally-extending divider member spanning the internal bore; and
    ii) a tube projecting longitudinally from the divider member;
wherein the tubes are aligned each with the others, and the stack of spacer elements and the bore thus define substantially discrete annular spaces outside the tubes and central spaces within the tubes and wherein the filtering, filtering/plugging and plugging material are located in the annular and central spaces, and the annular spaces comprise portions of one flowpath and the central spaces comprise portions of another flowpath.

5. The filter/plug drain assembly of claim 4, wherein:
  a) the bore is cylindrical;
  b) the divider members are circular; and
  c) each tube is substantially concentric with the associated divider member;
whereby, when the spacer elements are stacked within the interior bore, the tubes are substantially centered within the bore.

6. The filter/plug drain assembly of claim 4, wherein the drain body, divider members and tubes are made from polyvinyl chloride.

7. The filter/plug drain assembly of claim 4, wherein each divider member and associated tube are attached one to the other.

8. The filter/plug drain assembly of claim 1, further comprising a pad or pads comprising delustered hydrophobic and lipophilic synthetic fibers, interposed between some or all of the layers of filtering, filtering/plugging and plugging material.

9. The filter/plug drain assembly of claim 1, further comprising a pad or pads comprising polypropylene fibers, interposed between some or all of the layers of filtering, filtering/plugging and plugging material.

10. The filter/plug drain assembly of claim 1, wherein the selected contaminant is transformer oil and wherein the filtering material comprises:
  a) about one part a pelletized two-component mixture comprising:
    i) about 60% a styrene-ethylene/butylene-styrene copolymer comprising about 30% a linear, 0% diblock, copolymer of styrene and about 70% ethylene/butylene rubber; and
    ii) about 40% polypropylene; and b) about one part a pelletized styrene-ethylene/butylene-styrene copolymer comprising about 30% a linear, 70% diblock, copolymer of styrene and about 70% ethylene/butylene rubber.

11. The filter/plug drain assembly of claim 1, wherein the selected contaminant is transformer oil and wherein the filtering/plugging material is a granular mixture comprising:
   a) about 45% a styrene-ethylene/propylene copolymer comprising about 37% a 100% diblock copolymer of styrene and about 63% ethylene/propylene rubber;
   b) about 20% a styrene-ethylene/butylene-styrene copolymer comprising about 30% a linear, 0% diblock, copolymer of styrene and about 70% ethylene/butylene rubber; and
   c) about 35% a styrene-ethylene/butylene-styrene copolymer comprising about 31% a linear, 0% diblock, copolymer of styrene and about 69% ethylene/butylene rubber.

12. The filter/plug drain assembly of claim 1, wherein the selected contaminant is transformer oil and wherein the plugging material is a mixture of granular copolymers comprising:
   a) about one part a styrene-ethylene/propylene copolymer comprising about 37% a 100% diblock copolymer of styrene and about 63% ethylene/propylene rubber; and
   b) about one part a styrene-ethylene/butylene-styrene copolymer comprising about 30% a linear, 0% diblock, copolymer of styrene and about 70% ethylene/butylene rubber.

13. The filter/plug drain assembly of claim 1, wherein the selected contaminant is vehicle fuel and wherein the filtering material comprises a pelletized styrene-ethylene/butylene-styrene copolymer comprising about 30% a linear, 70% diblock, copolymer of styrene and about 70% ethylene/butylene rubber.

14. The filter/plug drain assembly of claim 1, wherein the selected contaminant is vehicle fuel and wherein the filtering/plugging material is a granular mixture comprising:
   a) about three parts a styrene-ethylene/butylene-styrene copolymer comprising about 31% a linear, 0% diblock, copolymer of styrene and about 69% ethylene/butylene rubber; and
   b) about one part a styrene-ethylene/propylene copolymer comprising about 37% a 100% diblock copolymer of styrene and about 63% ethylene/propylene rubber.

15. The filter/plug drain assembly of claim 1, wherein the selected contaminant is vehicle fuel and wherein the plugging material is a mixture comprising:
   a) about one part a pelletized styrene-ethylene/butylene-styrene copolymer comprising about 30% a linear, 70% diblock, copolymer of styrene and about 70% ethylene/butylene rubber;
   b) about two parts a granular styrene-butadiene-styrene copolymer comprising about 31% a linear, 16% diblock, copolymer of styrene and about 69% ethylene/butadiene; and
   c) about two parts a styrene-ethylene/butylene-styrene copolymer comprising about 33% a linear, 0% diblock, copolymer of styrene and about 67% ethylene/butylene rubber.

16. A filter/plug drain insert for insertion into a drain for containing spills of one or more selected liquid contaminants, the filter/plug drain insert comprising:
   a) a drain body having an internal bore
   b) a plurality of spacer elements stacked within the internal bore, each spacer element having:
      i) a permeable laterally-extending divider member spanning the internal bore; and
      ii) a tube projecting longitudinally from the divider member wherein the tubes are aligned each with the other or others, and the stack of spacer elements and the bore thus define substantially discrete annular spaces outside the tubes and central spaces within the tubes;
   c) plugging material, located in the downstream annular and central spaces, the plugging material forming a liquid-blocking plug when exposed to any of the selected contaminants;
   d) filtering/plugging material, located in either an annular or central space associated with a spacer element upstream of the plugging material, the filtering/plugging material passing water but impeding the passage of selected contaminants when low levels of contaminants are present in the water, and forming a plug when exposed to sufficient amounts of contaminants; and
   e) filtering material, located:
      i) at the same spacer element as the filtering/plugging material, within whichever of the associated annular and central spaces the filtering/plugging material is not located; and
      ii) in a layer spanning the bore, upstream of the filtering/plugging material;

wherein the interior of the filter/plug drain insert comprises two flowpaths, one flowpath which consists essentially of filtering, filtering/plugging and plugging material, and another which consists essentially of filtering and plugging material.

17. The filter/plug drain insert of claim 16, wherein the selected contaminant is transformer oil and wherein:
   a) the filtering material comprises:
      i) about one part a pelletized two-component mixture comprising:
         A) about 60% a styrene-ethylene/butylene-styrene copolymer comprising about 30% a linear, 0% diblock, copolymer of styrene and about 70% ethylene/butylene rubber; and
         B) about 40% polypropylene; and
      ii) about one part a pelletized styrene-ethylene/butylene-styrene copolymer comprising about 30% a linear, 70% diblock, copolymer of styrene and about 70% ethylene/butylene rubber;
   b) the filtering/plugging material is a granular mixture comprising:
      i) about 45% a styrene-ethylene/propylene copolymer comprising about 37% a 100% diblock copolymer of styrene and about 63% ethylene/propylene rubber;
      ii) about 20% a styrene-ethylene/butylene-styrene copolymer comprising about 30% a linear, 0% diblock, copolymer of styrene and about 70% ethylene/butylene rubber; and
      iii) about 35% a styrene-ethylene/butylene-styrene copolymer comprising about 31% a linear, 0% diblock, copolymer of styrene and about 69% ethylene/butylene rubber; and
   c) the plugging material is a mixture of granular copolymers comprising:
      i) about one part a styrene-ethylene/propylene copolymer comprising about 37% a 100% diblock copolymer of styrene and about 63% ethylene/propylene rubber; and
      ii) about one part a styrene-ethylene/butylene-styrene copolymer comprising about 30% a linear, 0% diblock, copolymer of styrene and about 70% ethylene/butylene rubber.

18. The filter/plug drain assembly of claim 16, wherein the selected contaminant is vehicle fuel and wherein:
- a) the filtering material comprises a pelletized styrene-ethylene/butylene-styrene copolymer comprising about 30% a linear, 70% diblock, copolymer of styrene and about 70% ethylene/butylene rubber;
- b) the filtering/plugging material is a granular mixture comprising:
    - i) about three parts a styrene-ethylene/butylene-styrene copolymer comprising about 31% a linear, 0% diblock, copolymer of styrene and about 69% ethylene/butylene rubber; and
    - ii) about one part a styrene-ethylene/propylene copolymer comprising about 37% a 100% diblock copolymer of styrene and about 63% ethylene/propylene rubber; and
- c) the plugging material is a mixture comprising:
    - i) about one part a pelletized styrene-ethylene/butylene-styrene copolymer comprising about 30% a linear, 70% diblock, copolymer of styrene and about 70% ethylene/butylene rubber;
    - ii) about two parts a granular styrene-butadiene-styrene copolymer comprising about 31% a linear, 16% diblock, copolymer of styrene and about 69% ethylene/butadiene; and
    - iii) about two parts a styrene-ethylene/butylene-styrene copolymer comprising about 33% a linear, 0% diblock, copolymer of styrene and about 67% ethylene/butylene rubber.

* * * * *